US 10,084,749 B2

(12) United States Patent
Undernehr et al.

(10) Patent No.: US 10,084,749 B2
(45) Date of Patent: *Sep. 25, 2018

(54) AUTOMATIC BLOCKING OF BAD ACTORS ACROSS A NETWORK

(71) Applicant: Walmart Apollo, LLC, Bentonville, AR (US)

(72) Inventors: Glen Thomas Undernehr, Fayetteville, AR (US); Charles Allen Courtright, Springdale, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 75 days.

This patent is subject to a terminal disclaimer.

(21) Appl. No.: 15/246,876

(22) Filed: Aug. 25, 2016

(65) Prior Publication Data

US 2016/0366098 A1 Dec. 15, 2016

Related U.S. Application Data

(63) Continuation of application No. 13/964,543, filed on Aug. 12, 2013, now Pat. No. 9,450,970.

(51) Int. Cl.
*H04L 29/06* (2006.01)
*H04L 12/701* (2013.01)
*H04L 29/08* (2006.01)

(52) U.S. Cl.
CPC ...... *H04L 63/0227* (2013.01); *H04L 63/1408* (2013.01); *H04L 63/1425* (2013.01);
(Continued)

(58) Field of Classification Search
CPC ............ H04L 63/0227; H04L 63/1441; H04L 63/1425; H04L 63/1408; H04L 29/06027; H04L 45/00; H04L 29/08072
See application file for complete search history.

(56) References Cited

U.S. PATENT DOCUMENTS 7,523,086 B1* 4/2009 Teague ............... H04L 41/0853
7,664,845 B2 2/2010 Kurtz et al.
(Continued)

FOREIGN PATENT DOCUMENTS

| JP | 2005064280 A | 3/2005 |
| JP | 2007129547 A | 5/2007 |
| WO | 2012164400 A2 | 12/2012 |

OTHER PUBLICATIONS

Notification of Transmittal of the International Search Report and the Written Opinion of the International Searching Authority from corresponding PCT/US2014/050537 dated Dec. 12, 2014, 22 pages.
(Continued)

*Primary Examiner* — Michael Pyzocha
(74) *Attorney, Agent, or Firm* — Schmeiser, Olsen & Watts LLP

(57) ABSTRACT

According to one aspect, embodiments of the invention provide a system for restricting access to a network, the system comprising a monitoring module configured to be coupled to a plurality of network access points and to monitor transmissions to the network via a plurality of network security appliances, and a blocking module, wherein the monitoring module is further configured to identify a potential bad actor based on a transmission from the potential bad actor to the network via a first one of the plurality of network access points and a first one of the plurality of network security appliances and provide information related to the potential bad actor to the blocking module, and wherein the blocking module is configured to confirm that the potential bad actor should be blocked and in response, to automatically configure each network security appliance to block the potential bad actor from accessing the network.

18 Claims, 9 Drawing Sheets

(52) U.S. Cl.
CPC .... *H04L 63/1441* (2013.01); *H04L 29/06027* (2013.01); *H04L 29/08072* (2013.01); *H04L 45/00* (2013.01)

(56) References Cited

U.S. PATENT DOCUMENTS

| | | | |
|---|---|---|---|
| 7,849,502 B1 | 12/2010 | Bloch et al. | |
| 8,239,386 B2 | 8/2012 | Bahlmann et al. | |
| 8,627,060 B2* | 1/2014 | Hart | H04L 63/1416 713/153 |
| 2004/0210479 A1* | 10/2004 | Perkowski | G06Q 30/02 705/14.51 |
| 2004/0255167 A1* | 12/2004 | Knight | G06Q 10/10 726/24 |
| 2006/0256730 A1 | 11/2006 | Compton | |
| 2007/0156829 A1 | 7/2007 | Deboy et al. | |
| 2009/0100522 A1* | 4/2009 | Kim | H04L 63/1433 726/25 |
| 2011/0191581 A1* | 8/2011 | Shim | H04L 67/12 713/158 |
| 2011/0289432 A1* | 11/2011 | Lucas | G06F 17/3089 715/753 |
| 2012/0023546 A1* | 1/2012 | Kartha | H04L 63/104 726/1 |
| 2012/0036577 A1* | 2/2012 | Bolzoni | H04L 43/00 726/23 |
| 2013/0036179 A1* | 2/2013 | Ferrell | G06Q 10/10 709/206 |
| 2014/0245389 A1 | 8/2014 | Oberheide et al. | |

OTHER PUBLICATIONS

Non-Final Office Action in related U.S. Appl. No. 13/964,543, dated Jan. 19, 2016; 23 pages.
Notice of Allowance in related U.S. Appl. No. 13/964,543 dated May 18, 2016; 11 pages.
Office Action in Japanese patent application No. 2016-534773 dated Jul. 17, 2018.

* cited by examiner

AUTOMATIC BLOCKING OF BAD ACTORS ACROSS A NETWORK

CROSS-REFERENCE TO RELATED APPLICATION

This application claims priority to U.S. patent application Ser. No. 13/964,543 to Wal-Mart Stores Inc., filed Aug. 12, 2013 and entitled "Automatic Blocking of Bad Actors Across a Network", which is hereby incorporated entirely herein by reference.

BACKGROUND OF THE DISCLOSURE

Field of the Invention

Aspects of the present invention relate to a system and method for preventing identified bad actors from accessing a network.

Discussion of Related Art

Large retailers typically operate networks by which consumers and/or devices at different locations may communicate. For example, a retailer may utilize the network to pass information between devices (e.g., servers, routers, databases, etc) at different locations (e.g., at different stores or administrative offices) or fulfill an order made by a consumer. A consumer may utilize the network to search the inventory of multiple stores or to place an order. Such a network may be utilized by retailers and/or consumers for any number of different tasks. It is a common goal of large retailers to prevent third parties, who intend to perform bad acts (e.g., to steal information, harm the network, harm the retailer, harm consumers, inject false information into the network, etc), from accessing their network.

SUMMARY

Embodiments described herein provide a system and method for automatically blocking an identified bad actor across each access point of a network. Once a bad actor is identified, the bad actor is automatically blocked at each access point of the network to prevent circumvention of the blocks. By simultaneously and automatically blocking a bad actor across each access point of a network, problems with block circumvention by the identified bad actor may be reduced as upon identification, the bad actor is automatically blocked across the network, at each network security appliance. Accordingly, time is not wasted manually blocking the identified bad actor at each individual network security appliance.

Additionally, according to at least one embodiment described herein, prior to a block being initiated across a network by a user, the user's authorization to initiate the block is confirmed to prevent unauthorized personnel from initiating blocks. According to at least one other embodiment described herein, an Internet Protocol (IP) address of an identified bad actor is compared against at least one list of IP addresses (e.g., of external or internal IP addresses used by a retailer) to check whether the IP address of the identified bad actor is actually used by the retailer. In this way, the retailer may be prevented from blocking itself or an approved vendor from accessing the network. According to at least one other embodiment described herein, prior to a block being initiated across a network by a first user, confirmation of the block by a second user must be received to ensure that the block is appropriate.

Aspects in accord with at least one embodiment of the present invention are directed to a system for restricting access to a network, the system comprising a plurality of network access points, a plurality of network security appliances, each coupled between at least one of the plurality of network access points and the network, a monitoring module coupled between the plurality of network access points and the network and configured to monitor transmissions between the plurality of access points and the network via the plurality of network security appliances, and a blocking module coupled to the monitoring module and to the plurality of network security appliances, wherein the monitoring module is further configured to identify a potential bad actor based on a transmission from the potential bad actor to the network via a first one of the plurality of network access points and a first one of the plurality of network security appliances and provide information related to the potential bad actor to the blocking module, and wherein the blocking module is configured to confirm that the potential bad actor should be blocked from accessing the network and in response, to automatically configure each one of the plurality of network security appliances to block the potential bad actor from accessing the network.

According to one embodiment, the monitoring module is further configured to identify the potential bad actor by identifying at least one predefined trigger within the transmission from the potential bad actor.

According to another embodiment, at least one of the plurality of network security appliances is a firewall. In one embodiment, the blocking module is further configured to transmit a SHUN command to each firewall within the plurality of network security appliances to block the potential bad actor from accessing the network via each firewall.

According to one embodiment, at least one of the plurality of network security appliances is an Intrusion Prevention System (IPS). In one embodiment, the blocking module is further configured to update a quarantine list of each IPS within the plurality of network security appliances to block the potential bad actor from accessing the network via each IPS.

According to another embodiment, the system further comprises at least one security terminal coupled to the monitoring module and configured to display an indication of the identified potential bad actor to a first user and to drive the monitoring module, based on an input of the first user at the at least one security terminal, to automatically transfer the information related to the potential bad actor to the blocking module. In one embodiment, the blocking module is further configured to confirm that the first user is authorized to access the blocking module via the at least one security terminal. In another embodiment, the blocking module is further configured to require two-factor authentication at the at least one security terminal to confirm that the first user is authorized to access the blocking module via the at least one security terminal.

According to one embodiment, the system further comprises a database coupled to the at least one security terminal that includes a list of Internet Protocol (IP) addresses, wherein the information related to the potential bad actor received by the blocking module from the monitoring module includes an IP address of the potential bad actor, and wherein the blocking module is further configured to compare the IP address of the potential bad actor to the list of IP addresses in the database and notify, via the at least one security terminal, the first user in response to a match between the IP address of the potential bad actor and an IP address within the list.

According to another embodiment, in response to the match between the IP address of the potential bad actor and the IP address within the list, the blocking module is further configured to prevent the IP address of the potential bad actor from being blocked from accessing the network. In another embodiment, the blocking module is further configured to provide the information related to the potential bad actor to a second user via the at least one security terminal, to prompt the second user to confirm whether the potential bad actor should be blocked from accessing the network, and to automatically configure each one of the plurality of network security appliances to block the potential bad actor from accessing the network in response to a confirmation from the second user that the potential bad actor should be blocked.

Another aspect in accord with at least one embodiment of the present invention is directed to a method for restricting access to a network including a plurality of access points and a plurality of network security appliances, each network security appliance coupled between at least one of the plurality of access points and the network, and the method comprising monitoring, with a monitoring module, transmissions between third parties and the network via the plurality of access points and the plurality of network security appliances, identifying, with the monitoring module, a potential bad actor based on a transmission between the potential bad actor and the network via a first one of the plurality of access points and a first one of the plurality of network security appliances, transferring, from the monitoring module to a blocking module, information related to the potential bad actor, confirming, with the blocking module, that the potential bad actor should be blocked from accessing the network, and automatically configuring each one of the plurality of network security appliances to block the potential bad actor from accessing the network.

According to one embodiment, the method further comprises displaying the information related to the potential bad actor, identified by the monitoring module, to a first user via a first security terminal, and wherein transferring includes automatically transferring, from the monitoring module to the blocking module, the information related to the potential bad actor in response to an indication from the first user at the first security terminal that the information should be transferred. In another embodiment, the method further comprises confirming that the first user is authorized to operate the blocking module. In one embodiment, the information related to the potential bad actor includes an IP address of the potential bad actor, and wherein the method further comprises determining whether the IP address of the potential bad actor is utilized externally by the network, and in response to a determination that the IP address of the potential bad actor is utilized externally by the network, preventing the IP address of the potential bad actor from being blocked from accessing the network.

According to another embodiment, the method further comprises determining whether the IP address of the potential bad actor is utilized internally by the network, and in response to a determination that the IP address of the potential bad actor is utilized internally by the network, prompting, via the first security terminal, the first user to confirm whether the IP address of the potential bad actor should be blocked from accessing the network, wherein, automatically configuring includes automatically configuring each one of the plurality of network security appliances to block the potential bad actor from accessing the network in response to an indication from the first user, via the first security terminal, that the IP address of the potential bad actor should be blocked from accessing the network.

According to one embodiment, the method further comprises prompting the first user, via the first security terminal, to select a secondary user for backup review, displaying the information related to the potential bad actor to a second user selected by the first user via a second security terminal, and prompting the second user, via the second security terminal, to confirm whether the potential bad actor should be blocked from accessing the network, wherein automatically configuring includes automatically configuring each one of the plurality of network security appliances to block the potential bad actor from accessing the network in response to an indication from the second user, via the second security terminal, that the IP address of the potential bad actor should be blocked from accessing the network.

According to another embodiment, the method further comprises generating a change control based on the information related to the potential bad actor in response to automatically configuring each one of the plurality of network security appliances to block the potential bad actor from accessing the network.

One aspect in accord with at least one embodiment of the present invention is directed to a system for restricting access to a retail network, the system comprising a plurality of network access points, a plurality of network security appliances, each one coupled between at least one of the plurality of network access points and the network, a monitoring module coupled between the plurality of network access points and the network and configured to monitor transmissions between the plurality of access points and the network via the plurality of network security appliances, and means for identifying a potential bad actor, confirming that the potential bad actor should be blocked from accessing the network, and blocking the identified bad actor at each one of the plurality of network security appliances from accessing the network.

Another aspect in accord with at least one embodiment of the present invention is directed to a system for restricting access to a network that includes a plurality of network access points and a plurality of network security appliances, the system comprising a monitoring module configured to be coupled to the plurality of network access points and to monitor transmissions to the network via the plurality of network security appliances, and a blocking module coupled to the monitoring module and also configured to be coupled to the plurality of network security appliances, wherein the monitoring module is further configured to identify a potential bad actor based on a transmission from the potential bad actor to the network via a first one of the plurality of network access points and a first one of the plurality of network security appliances and provide information related to the potential bad actor to the blocking module, and wherein the blocking module is configured to confirm that the potential bad actor should be blocked from accessing the network and in response, to automatically configure each one of the plurality of network security appliances to block the potential bad actor from accessing the network.

BRIEF DESCRIPTION OF DRAWINGS

The accompanying drawings are not intended to be drawn to scale. In the drawings, each identical or nearly identical component that is illustrated in various FIGs. is represented by a like numeral. For purposes of clarity, not every component may be labeled in every drawing. In the drawings.

DETAILED DESCRIPTION

Figure 1:
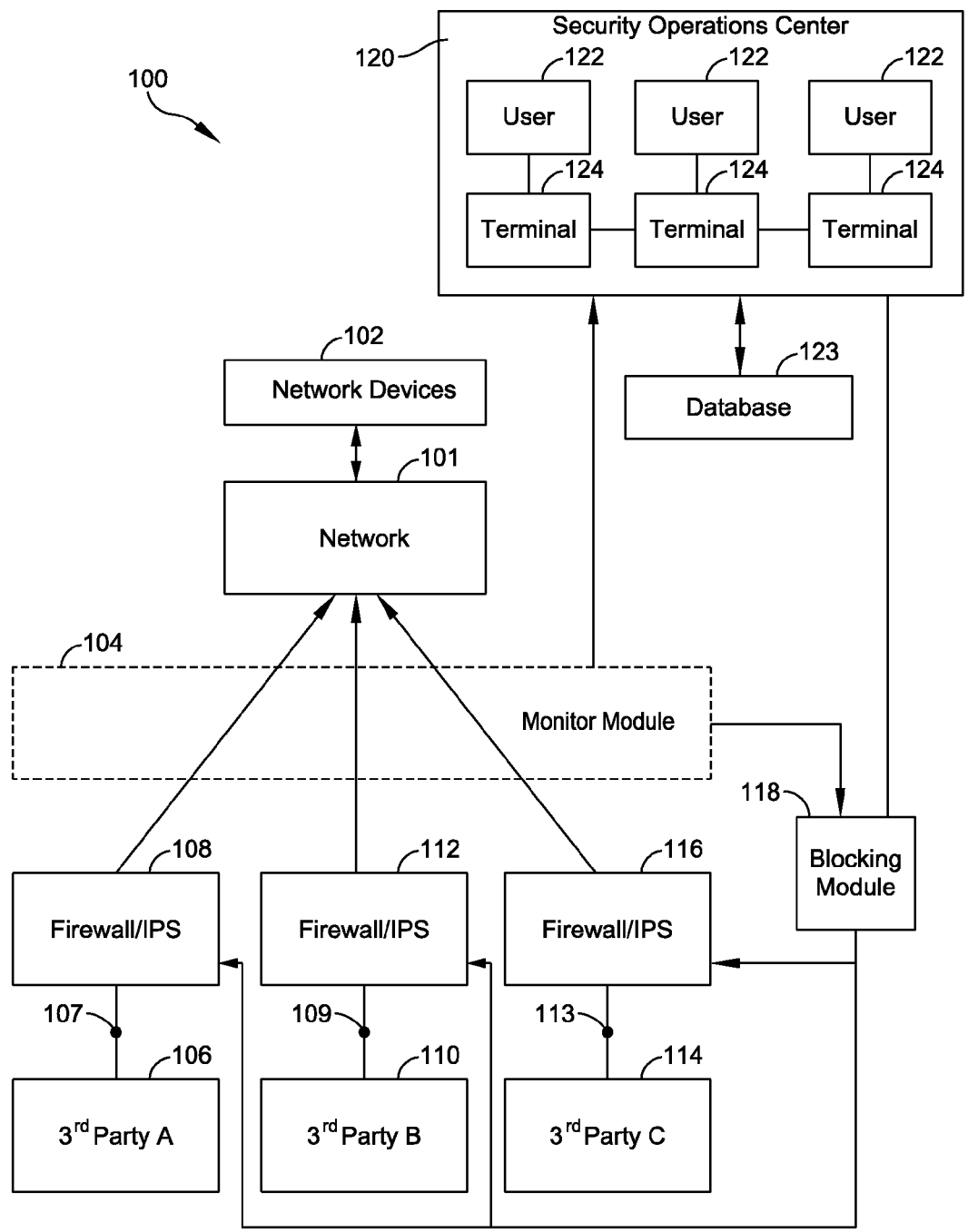
FIG. 1 is a block diagram illustrating a retail network in accordance with one aspect of the present invention.

Embodiments of the invention are not limited to the details of construction and the arrangement of components set forth in the following description or illustrated in the drawings. Embodiments of the invention are capable of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

As discussed above, it is a common goal of large retailers to prevent third parties who intend to perform bad acts (i.e., bad actors) from accessing their network. Common procedures for blocking network access to an identified bad actor include manually blocking the bad actor from accessing the network via the access point of the network at which the bad actor was identified. For example, upon identifying that a 3rd party, who is accessing the network through a first firewall, is attempting to perform a bad act, a security officer may manually configure the first firewall to block the third party from accessing the network. However, this process may be slow and in addition, the bad actor may attempt to access the network from another access point. The security officer may attempt to manually configure additional firewalls, on a one by one basis, to block the third party from accessing the network; however, this may very time consuming (especially across a global network) and it is likely that the bad act performed by the third party would be completed before the security officer had an opportunity to block the bad actor across all access points of the network.

In addition to the long time requirements, such common procedures for manually blocking a bad actor at each individual access point of a network, on a one by one basis, may also include challenges related to incident documentation, change control management, multiple required procedures for multiple types of firewalls, expiration of blocks installed on firewalls, cyber reconnaissance, and accidental targeting of internal assets rather than an external source threat.

Accordingly, embodiments described herein provide a system and method for automatically blocking an identified bad actor across each access point of a network. Once a bad actor is identified, the bad actor is automatically blocked at each access point of the network to prevent circumvention of the blocks. Such automatic blocking of bad actors across a network may drastically reduce the time required to completely block a bad actor from accessing a network. In addition, as discussed in greater detail below, the system and method described herein may also provide solutions to the additional challenges associated with manual across-network (i.e., one by one) blocking identified above.

FIG. 1 is a block diagram 100 illustrating a network 101 of a retailer in accordance with one aspect of the present invention. As described above, the retail network 101 is configured to allow communication between a variety of network devices 102 (e.g., servers, routers, switches, databases, computers, etc). According to one embodiment, the network 101 is a Local Area Network (LAN) (e.g., an Ethernet network) and the network devices 102 are located in relative close proximity (e.g., in the same building or store). According to another embodiment, the network 101 is a Wide Area Network (WAN) (e.g., the Internet) and the network devices 102 may be located at different locations (e.g., at different stores, offices, etc).

As also described above, the retail network 101 is also configured to allow communication between the network devices 102 and different third parties 106, 110, 114. According to one embodiment, at least one of the third parties 106, 110, 114 is a customer who is attempting to retrieve information (e.g., product or availability information) from network devices 102 or place an order via the network 101. In another embodiment, at least one of the third parties 106, 110, 114 is an administrator or operator of the network 101 or device(s) 102. In another embodiment, at least one of the third parties 106, 110, 114 is a bad actor who intends to do harm to the network 101, a network device 102, or another third party. According to other embodiments, a third party may be any other type of user that is trying to access the network 101 and at least one network device 102 coupled to the network.

As shown in FIG. 1, different third parties 106, 110, 114 may access the network 101 via different access points 107, 109, 113 (e.g., via different routers, servers, links, switches, etc.) of the network 101. Each access point 107, 109, 113 is coupled to the network 101 via a network security appliance 108, 112, 116. According one embodiment, at least one of the network security appliances 108, 112, 116 is a firewall. For example, in one embodiment, at least one of the network security appliances 108, 112, 116 is a firewall manufactured by CISCO SYSTEMS®, Inc., of San Jose, Calif.; however, in other embodiments, any other type of firewall may be utilized.

According to another embodiment, at least one of the network security appliances 108, 112, 116 is an Intrusion Prevention Systems (IPS). For example, in one embodiment, at least one of the network security appliances 108, 112, 116 is a TippingPoint IPS manufactured by the HEWLETT PACKARD ENTERPRISE® Company of Palo Alto, Calif.; however, in other embodiments, any other type of IPS may be utilized. According to other embodiments, an access point 107, 109, 113 may be coupled to the network 101 via any other type of network security appliance. Also, according to at least one embodiment, multiple third parties may access the network 101 via the same access point and/or the same network security appliance.

According to one embodiment, the activity of each third party 106, 110, 114 in relation to the network 101 is monitored by a network access monitoring module (monitor) 104 coupled between each access point 107, 109, 113 and the network 101. According to one embodiment, the monitoring module 104 is operated within at least one of the network devices 102 (e.g., a server, computer, router etc.). The network access monitoring module 104 monitors transmissions between each third party 106, 110, 114 and the network 101 to identify potential bad actors. According to one embodiment, the monitoring module 104 identifies potential bad actors based on certain predefined triggers within the transmissions that signify a potential bad actor.

According to one embodiment, the defined triggers are based on what a third party is trying to accomplish by accessing the network 101 (i.e., the content or payload of signals received from the third party). For example, according to one embodiment, signals from a third party that are attempting to gain information about the network 101 and/or network devices 102 are triggers identifying to the monitoring module 104 that the third party is a potential bad actor. For instance, some signals that identify a bad actor to the monitoring module 104 are: a scan of ports of the network devices 102, a mapping of the network 101, a profile scan of the network 101, a Structure Query Language (SQL) injection, or fishing attack, to name a few. According to other embodiments, any other type of signal or activity may be defined as a trigger signaling a potential bad actor to the monitoring module 104.

According to one embodiment, the network access monitoring module 104 is the ARCSIGHT® Security Intelligence Platform manufactured by the HEWLETT PACKARD ENTERPRISE® Company of Palo Alto, Calif.; however, in other embodiments, any other type of network access monitoring module 104 may be utilized.

According to one embodiment, as the network access monitoring module 104 monitors the activity of third parties 106, 110, 114 in relation to the network 101 and identifies potential bad actors, it provides an indication of identified potential bad actors to a security operations center 120. According to one embodiment, the indications of identified potential bad actors from the network access monitoring module 104 are monitored by personnel at the security operations center 120. For example, according to one embodiment, the indications of identified potential bad actors from the monitoring module 104 are monitored by users 122 (e.g., security officers) at the security operations center 120. According to one embodiment, each user 122 operates a terminal 124 that displays (e.g., via a Graphical User Interface (GUI)) the indications of identified potential bad actors from the monitoring module 104.

Figure 2:
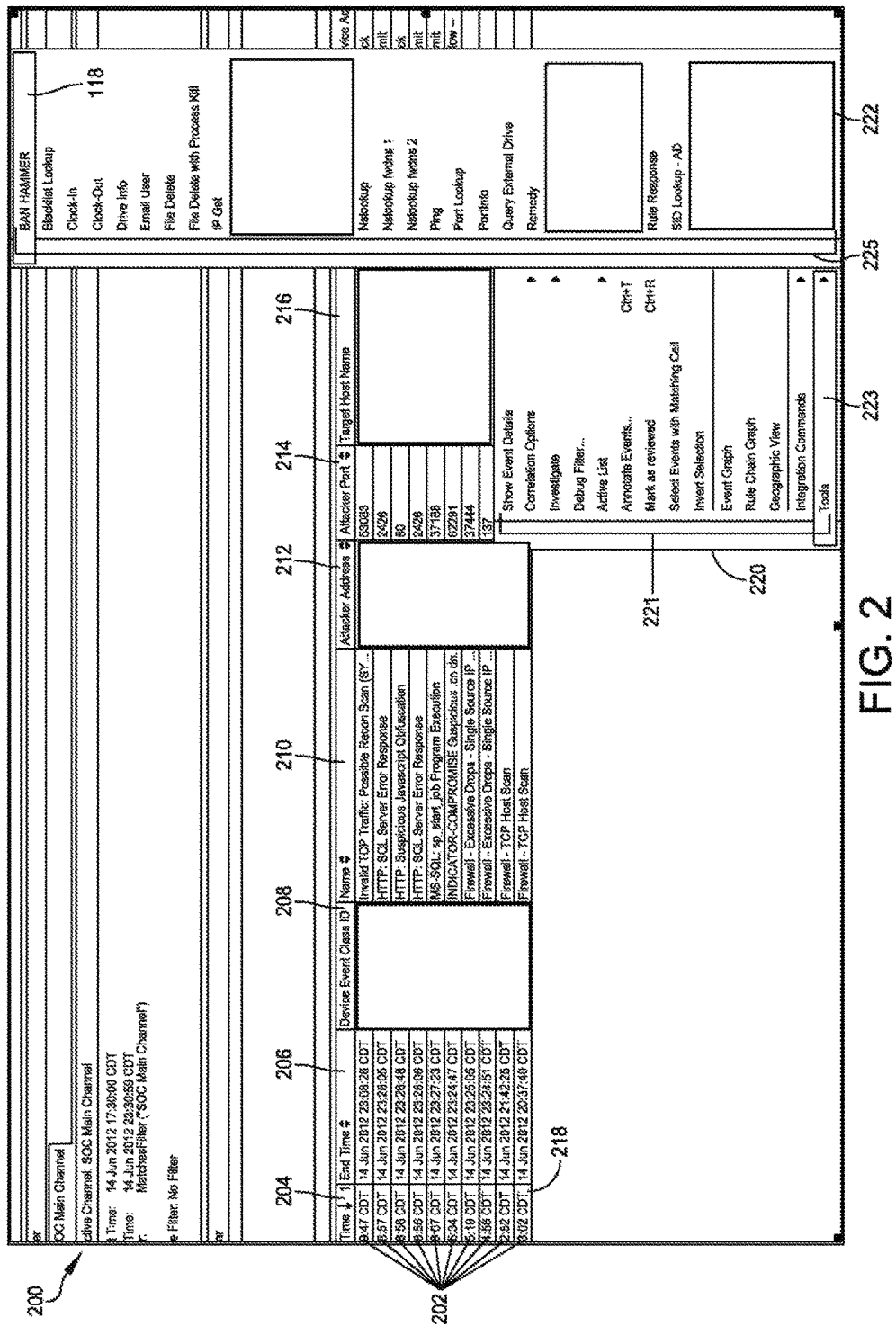
FIG. 2 is a screenshot view of a monitoring module in accordance with one embodiment of the present invention.

FIG. 2 illustrates a network accessing monitoring module GUI 200 displayed on a terminal 124 within the security operations center 120. The GUI includes a list 202 of potential bad actors identified by the network access monitoring module 104. According to one embodiment, the list 202 may include any number of potential bad actors. Each potential bad actor within the list 202 is displayed in relation to the potential bad act which was identified by the monitoring module 104. For example, according to one embodiment, each potential bad actor within the list 202 is identified by a bad act start time 204, a bad act end time 206, a bad act type identifier 208, a bad act description 210, the Internet Protocol (IP) address 212 of the potential bad actor, the port (i.e., access point) 214 of the potential bad actor, and the name of the intended target 216. According to other embodiments, each potential bad actor included in the list 212 may be identified by any other type of information which may assist a user 122 in determining whether the potential bad actor should be blocked from accessing the network 101.

As a user 122 monitors the GUI 200 via a terminal 124, the user may determine, based on information displayed in the list 202, that at least one of the listed potential bad actors should be blocked from accessing the network 101. For example, as shown in FIG. 2, the potential bad actor 218 at the bottom of the list 202 (i.e., entry 218) was identified by the monitoring module 104 as a potential bad actor due to an attempted initiation of a Transmission Control Protocol (TCP) scan on the network 101. If the user 122 decides that the third party who initiated the TCP scan should be blocked from accessing the network 101, the user 122 may operate the GUI 200 to automatically transfer information related to the potential bad actor to a network access blocking module (blocker) 118. According to one embodiment, the blocking module 118 is operated within at least one network device 102 (e.g., a server, computer, processor, etc.) coupled to the network 101.

According to one embodiment, the user 122 transfers the information related to the potential bad actor to the network access blocking module 118 by selecting the desired entry 218 in the list 202. In one embodiment, the user 122 selects the desired entry 218 with a mouse or keypad of the terminal 124; however, in other embodiments, any other appropriate technique for selecting an entry in the list 202 may be utilized. According to one embodiment, once the desired entry 218 in the list 202 is selected, a pop-up window 220 is displayed in the GUI 200 that displays a list of potential actions 221 that the user 122 may take in relation to the selected entry 218. The list of potential actions 221 may include any type or number of actions that the user 122 may take in relation to the selected entry 218. According to one embodiment, one of the actions 221 is a "Tools" entry 223.

Upon selecting the "Tools" entry 223 (e.g., via the mouse or keypad of the terminal 124), a second pop-up window 222 is displayed including a list of tools 225 that the user 122 may operate in relation to the selected entry 218. The list of tools 225 may include any number of tools 225 that the user 122 may utilize in relation to the selected entry 218. According to one embodiment, one of the tools 225 is the network access blocking module 118. As shown in FIG. 2, the network access blocking module 118 is titled "BAN HAMMER"; however, in other embodiments, the network access blocking module 118 may be titled in any other way.

Figure 3:
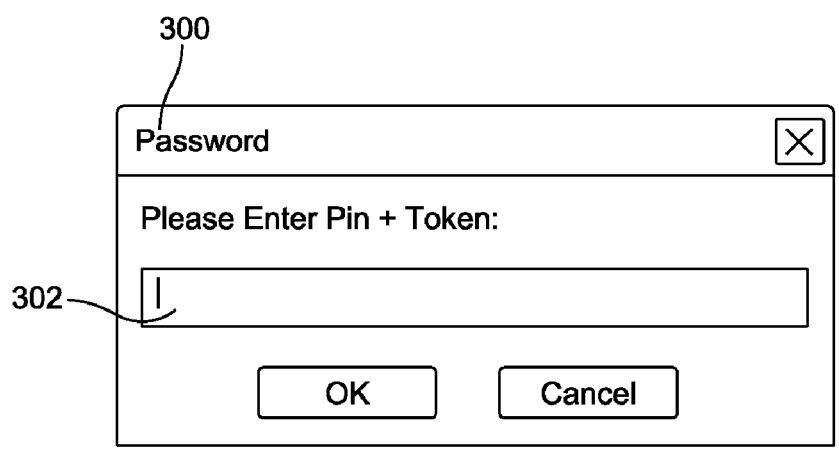
FIG. 3 is a screenshot view of an authentication Graphical User Interface (GUI) of a blocking module in accordance with one embodiment of the present invention.

According to one embodiment, upon selecting the network access blocking module 118 from the list of tools 225, the network access blocking module 118 confirms that the user 112 who selected the blocking module 118 is authorized to operate the blocking module 118. According to one embodiment, the blocking module 118 prompts the current user 122 at the terminal 124 with a message requesting that the user input a password to proceed. In another embodiment, the blocking module 118 prompts the current user 122 at the terminal 124 to connect a security token (i.e., a small hardware device (e.g., a key fob) that authorizes access to the blocking module 118) to the terminal 124. According to one embodiment, the blocking module 118 requires two-factor authentication (e.g., the use of a password and a security token) for a user 122 to access the blocking module 118. For example, as shown in FIG. 3, the network access blocking module 118 may display a GUI 300 to the user 122 via the terminal 224 that requires a user 122, who is requesting access to the blocking module 118, to enter a password in a defined area 302 and also to connect an authorized security token to the terminal 224 (e.g., via a hardwired or wireless connection). According to other embodiments, any other appropriate type of user authentication may be required. Upon verifying that the user 122 is authorized to operate the blocking module 118, the blocking module 118 is started up.

According to another embodiment, the network access blocking module 118 does not confirm that the user 122 requesting access to the blocking module 118 is an authorized user. Rather, upon being selected from the list of tools 225 by a user 122, the network access module 118 is started up immediately.

Upon the network access blocking module 118 starting up, information regarding the selected bad actor (from the selected entry 218) is automatically passed from the monitoring module 104 to the network access blocking module 118. According to one embodiment, the IP address 212 of the identified bad actor is passed automatically to the network access blocking module 118; however, in other embodiments, any other information related to the bad actor may be automatically passed to the network access blocking module 118. It is appreciated that by automatically passing the IP information from the monitoring module 140 to the blocking module 118, human translation errors (e.g., typing errors) typically associated with the manual entry of bad actor information into a network security appliance may be avoided.

According to one embodiment, upon receiving the bad actor information (e.g., the IP address of the bad actor) from the monitoring module 140, the blocking module 118 compares the received IP address of the bad actor with a list of external IP addresses (i.e., externally facing IP addresses) that are utilized by the retail operator of the network 101. In one embodiment, the list of external IP addresses is stored in a database within the terminal 124. In another embodiment, the list of external IP addressed is stored in a central database 123 located externally from the individual terminal 124.

According to one embodiment, the list of external IP addresses includes externally facing IP addresses that are used by the retailer, and as such, should not be blocked from accessing the network 101 and/or network devices 102. If the blocking module 118 determines that the IP address of the bad actor received from the monitoring module 104 matches one of the external IP addresses in the list, the blocking module displays a message to the user 122, via the terminal 224, indicating that the bad actor's IP address is actually an external IP address utilized by the retailer.

According to one embodiment, upon matching the bad actor's IP address to a predefined external IP address, the blocking module 118 automatically prevents the matched IP address from being blocked and indicates such to the user 122. In another embodiment, upon matching the bad actor's IP address to an external IP address in the list, the blocking module 118 provides a warning to the user 122 via the terminal 124, indicating that the bad actor's IP address is actually an external IP address used by the retailer, and confirming whether the user 122 still wishes to block the externally matched IP address.

If the bad actor's IP address received from the monitoring module 140 does not match a predefined external IP address, the blocking module 118 compares the bad actor's IP address to a list of IP addresses used internally by the retailer which the retailer may not want to block from accessing the network 101 and/or network devices 102. According to one embodiment, the list of IP addresses is stored locally within the terminal 124. In another embodiment, the list of internal IP addresses is stored in a central database 123 external from the terminal 124. If the blocking module 118 determines that the IP address of the bad actor received from the monitoring module 104 matches one of the internal IP addresses in the list, the blocking module will display a message to the user 122 via the terminal 224, indicating that the bad actor's IP address is actually an internal IP address utilized by the retailer.

Figure 4:
FIG. 4 is a screenshot view of a warning GUI of a blocking module in accordance with one embodiment of the present invention.

According to one embodiment, upon matching the bad actor's IP address to an internal IP address in the list, the blocking module 118 provides a warning to the user 122, indicating that the bad actor's IP address is used internally by the retailer and confirming whether the user 122 wishes to proceed in blocking the matched IP address. For example, such a warning 400 is illustrated in FIG. 4. The warning 400 notifies the user 122 that the IP address of the bad actor was found internally within the retailers IP space and confirms whether the user 122 would like to proceed in blocking the matched IP address of the bad actor. If the user 122 indicates that the matched IP address should not be blocked, the blocking module 118 prevents the matched IPS address from being blocked. If the user 122 indicates that the matched IP address should be blocked despite its presence in the list of internal IP addresses, the blocking module 118 works to block the IP address of the bad actor.

In another embodiment, upon matching the bad actor's IP address to a predefined internal IP address, the blocking module 118 automatically prevents the matched IP address from being blocked and indicates such to the user 122 via the terminal 124.

According to one embodiment, the IP address of the bad actor is compared against the list of predefined external IP addresses and the list of predefined internal IP addresses. In other embodiments, the IP address of the bad actor may be compared solely against a single list of predefined external IP addresses, predefined internal IP addresses, or predefined external and internal IP addresses. According to other embodiments, the bad actor's IP address may be compared to any other type of predefined list (e.g., a blacklist, an approved tester list, etc.) defined by the retailer.

It is to be appreciated that by checking the bad actor's IP address against a list of predefined external and/or internal IP addresses utilized by the retailer, the erroneous blocking of IP addresses which the retailer does not actually wish to block (e.g., IP addresses associated with itself or approved vendors), may be avoided.

Figure 5:
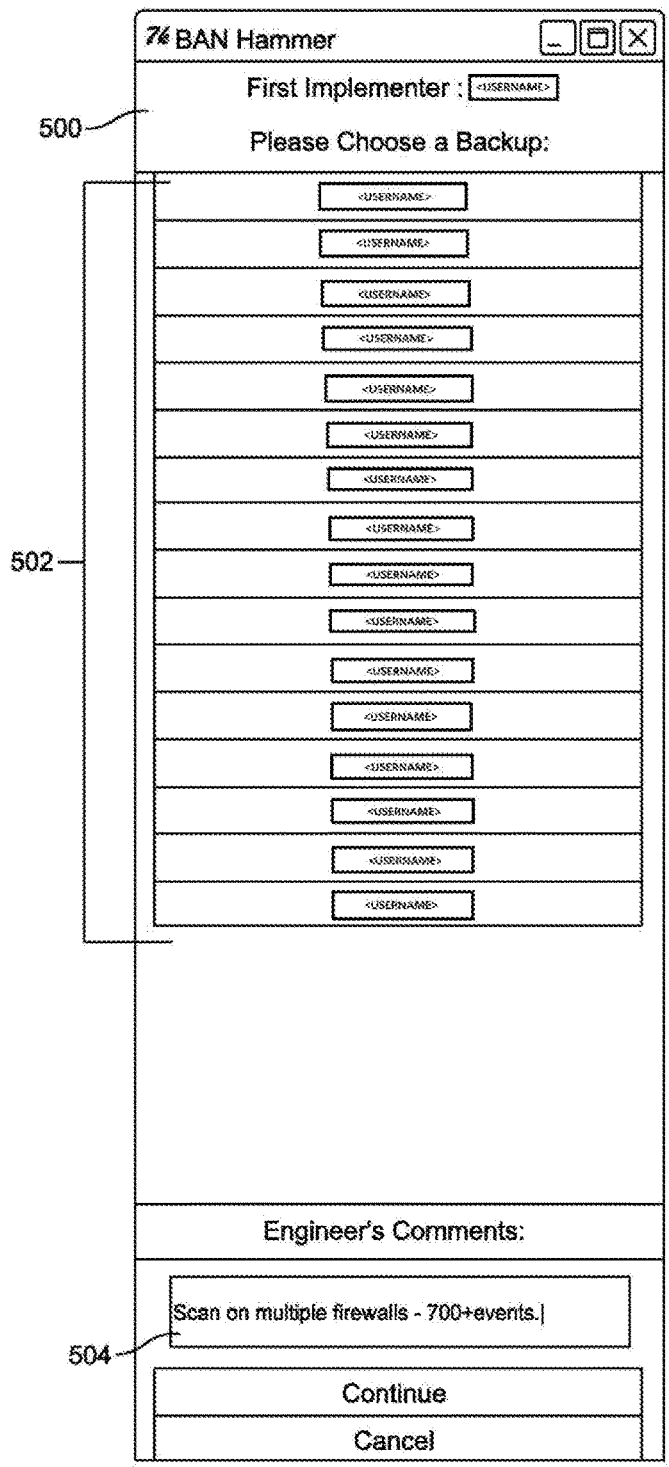
FIG. 5 is a screenshot view of a backup reviewer selection GUI of a blocking module in accordance with one embodiment of the present invention.

According to one embodiment, if the bad actor's address does not match any predefined external or internal IP addresses utilized by the retailer, the blocking module 118 displays, via the terminal 124, a GUI 500 (as seen in FIG. 5) that prompts the user 122 to select another user (i.e., a secondary or backup user) to review the block that is about to be placed on the identified bad actor. The GUI 500 includes a list 502 of potential secondary users. The user 122 selects (e.g., via a keyboard or mouse of the terminal 124) one of the secondary users 502 for review of the pending block action.

According to one embodiment, the GUI 500 also includes a text area 504 that allows the user 122 to enter text (e.g., comments, notes, etc.) that the user 122 wishes to have associated with the pending block action.

After the user 122 selects one of the listed secondary users 502 for review of the pending block action (e.g., via the terminal 124), information regarding the identified bad actor and the pending block on the bad actor is passed to the selected secondary user 502. According to one embodiment, the information passed to the selected secondary user 502 is displayed via another terminal 124 being operated by the selected secondary user 502. According to another embodiment, the selected secondary user 502 may review the information on the original terminal 124 at which the block was requested. According to one embodiment, the information regarding the identified bad actor and the pending block on the bad actor is displayed automatically to the selected secondary user 502, via the terminal 124, once the user 121 has chosen the selected secondary user 502; however, in another embodiment, the information regarding the identified bad actor and the pending block on the bad actor is displayed only upon initiation or request by the selected secondary user 502.

Figure 6:
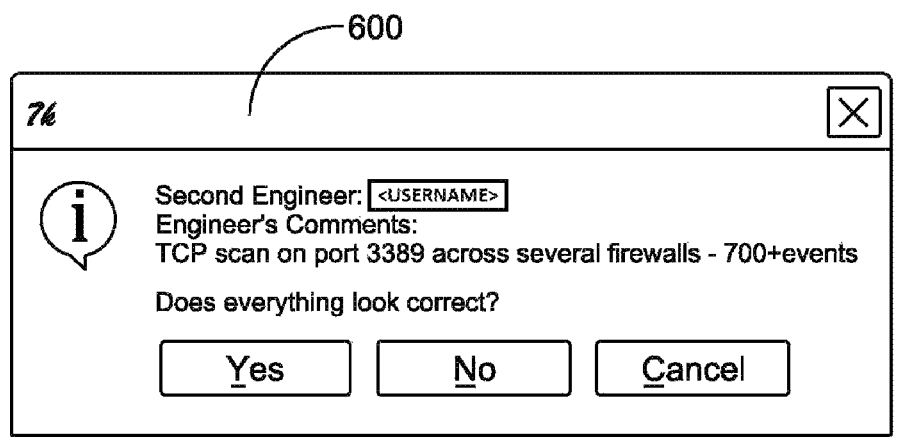
FIG. 6 is a screenshot view of a backup reviewer confirmation GUI of a blocking module in accordance with one embodiment of the present invention.

According one embodiment, the blocking module 118 displays information regarding the bad actor and the pending block, via the terminal 124, to the selected secondary user 502 in a GUI 600 (as seen in FIG. 6). According to one embodiment, the GUI 600 identifies the selected secondary user 502, any comments related to the bad actor that were input by the original user 122, and the trigger that caused the bad actor to be identified. According to another embodiment, the GUI 600 may include any other information regarding the bad actor and the pending block on the bad actor. The GUI 600 also prompts the selected secondary user 502 to confirm whether it is acceptable for the blocking module 118 to proceed in blocking the identified bad actor. The selected secondary user 502 may interact with the GUI 600 to indicate that the pending block should be cancelled or should proceed.

If the selected secondary user 502 indicates to the blocking module 118, at the terminal 124, that the block of the bad actor should proceed, the blocking module 118 simultaneously blocks the bad actor from accessing the network 101 at each access point 107, 109, 113 of the network 101 by configuring the network security appliance 108, 112, 116 coupled to each access point 107, 109, 113. For example, according to one embodiment, where at least one of the network security appliances 108, 112, 116 is a firewall, a command (e.g., a SHUN command) is sent by the blocking module 118 to each one of the firewalls 108, 112, 116 coupled to the network 101 to block network access from the bad actor's IP address. According to one embodiment, after a predetermined amount of time (e.g., three days), the user 122 may reconfigure the firewalls 108, 112, 116 to remove the block and allow access to the network from the previously blocked IP address. According to another embodiment, the user 122 may not remove the block after the predetermined time period.

According to another embodiment, where at least one of the network security appliances 108, 112, 116 is an IPS, the blocking module 118 updates the quarantine list of each IPS 108, 112, 116 coupled to the network 101 to include the IP address of the blocked bad actor. According to one embodiment, after a predetermined amount of time, the IPS's 108, 112, 116 automatically remove the block on the bad actor. According to one embodiment, the network security appliances 108, 112, 116 include a mix of firewalls, IPS's, and/or other types of network security appliances.

According to one embodiment, upon successfully blocking a bad actor across the network 101, the blocking module 118 creates a change control (i.e., a ticket) that references the new block that was just placed on the bad actor. The change control may be stored in a database for future reference. According to one embodiment, the change controls generated by the blocking module 118 are searchable.

It is appreciated that by simultaneously and automatically blocking an identified bad actor across each access point of the network 101, problems with block circumvention by the identified bad actor may be reduced as upon identification, the bad actor is automatically blocked across the network, at each network security appliance. Accordingly, time need not be wasted manually blocking the identified bad actor at each individual network security appliance. Operation of the blocking module 118 is discussed in greater detail below.

Figure 7:
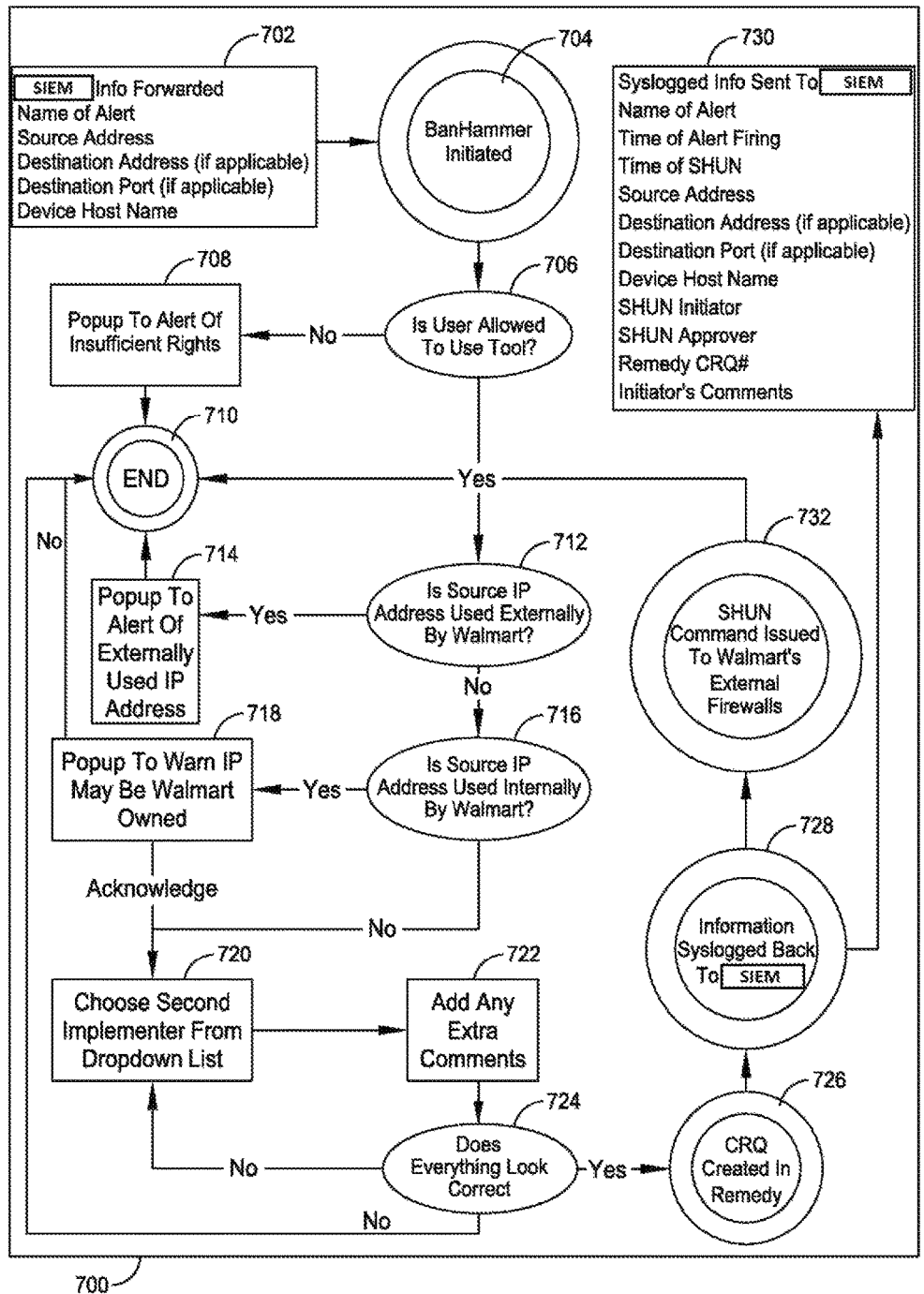
FIG. 7 is a flow diagram of a process for restricting access to a network in accordance with one embodiment of the present invention.

FIG. 7 is a flow chart 700 illustrating a process for dynamically blocking bad actors across a network 101 in accordance with at least one embodiment described herein. At block 702, upon initiation at a terminal 124 by a user 121 (e.g., a security officer), information regarding an identified bad actor is directly forwarded from the monitoring module 104 to the blocking module 118, as discussed above. According to one embodiment, the forwarded information includes the identified IP address of the potential bad actor, the type of signal which triggered the identification of the potential bad actor, the IP address of the target, the port (i.e., access point) of the target, and/or identification information of a targeted network device 102. According to other embodiments, the forwarded information from the monitoring module 104 may include any type of information related to the identified bad actor and corresponding bad act.

At block 704, upon receiving information directly from the monitoring module 104, the blocking module 118 is initiated. At block 706, a determination is made whether the user 121 is authorized to operate the blocking module 118. For example, as discussed above, the blocking module 118 may authorize the user 121 by requiring the user 121 to enter a pin and/or couple a security token to the terminal 124. At block 708, in response to a determination that the user 121 is not authorized to use the blocking module 118, the blocking module displays a popup message to the user 121, via the terminal 124, indicating that the user 121 has insufficient access rights to utilize the blocking module 118. According to one embodiment, at block 710, after access to the blocking module 118 is denied for the user 121, the blocking module 118 is exited.

In response to a determination that the user 121 is authorized to use the blocking module 118, at block 712 the blocking module determines if the identified IP address of the potential bad actor (received from the monitoring module 104) is used externally by the retailer. For example, in one embodiment described above, the blocking module 118 compares the identified IP address to a list of predefined externally used IP addresses of the retailer. In response to a determination that the identified IP address matches an external IP address utilized by the retailer (i.e., matches an external IP address within the list of external IP addresses), at block 714 the blocking module 118 displays a popup message to the user 121, via the terminal 124, indicating that the identified IP address is used externally by the retailer and therefore cannot be blocked from accessing the network 101. According to one embodiment, at block 710, after the matched external IP address is identified to the user 121, the blocking module 118 is exited.

In response to a determination that the identified IP address is not externally used by the retailer, at block 716 the blocking module 118 determines if the identified IP address is used internally by the retailer. For example, according to one embodiment as described above, the blocking module 118 compares the identified IP address with a list of predefined internally used IP addresses of the retailer. In response to a determination that the identified IP address matches an internal IP address utilized by the retailer (i.e., matches an internal IP address within the list of internal IP addresses), at block 718 the blocking module 118 displays a popup message to the user 121, via the terminal 124, indicating that the identified IP address is used internally by the retailer. According to one embodiment, the popup message also confirms whether the user 121 would like to proceed with blocking the identified IP address despite its internal use by the retailer. In response to the user 121 indicating to the blocking module 118 that the block of the identified internally used IP address should not be blocked, at block 710 the blocking module 118 is exited.

In response to the user 121 indicating to the blocking module 118 that the block of the identified IP address should continue despite the IP address being used internally by the retailer or in response to the blocking module 118 determining that the identified IP address is not internally used, at block 720 the blocking module 118 prompts the user 121 to select a secondary user 502 for backup review of the pending block of the identified IP address of the bad actor. At block 722 the user 121 may also input text (e.g., comments, notes, etc.) that the user 121 wants associated with the pending block.

At block 724, the information related to the identified bad actor, the pending block, and/or any associated text is provided to the secondary user 502 selected by the user 121. The selected secondary user 502 may review the provided information and choose to cancel or advance the pending block. In response to an indication from the selected secondary user 502 that the block should be cancelled, at block 710 the blocking module 118 is exited. In response to an indication from the selected secondary user 502 that the block should proceed, at block 726 a closed change control (i.e., change request or ticket) is created that references the new block on the identified bad actor (i.e., the identified bad actor's IP address). According to one embodiment the change control is stored in a searchable database. According to one embodiment, the change control is generated with Information Technology (IT) service management software such as Remedy, manufactured by BMC Software of Houston, Tex.; however, in other embodiments, any type of IT service management software may be utilized.

At block 728, information 730 regarding the new block of the identified bad actor is provided (e.g., logged or Syslogged) back to the monitoring module 104. According to one embodiment, the information 730 provided back to the monitoring module 104 includes the type of activity that triggered the block, the time that the activity was identified, the time that the block was initiated, the IP address of the bad actor, the target address, the target port, the name or address of a network device 102 targeted by the bad actor, the identity of the user 121, the identity of the selected secondary user 502, the identification number of the change control, and/or any text entered by the user 121. According to other embodiments, the information 730 may include any other type of information related to the bad actor and corresponding bad act.

At block 732, the blocking module 118 simultaneously blocks the bad actor (i.e., the bad actor's IP address) from accessing the network 101 at each access point 107, 109, 113 of the network 101 by configuring the network security appliance 108, 112, 116 coupled to each access point 107, 109, 113. For example, according to one embodiment, where at least one of the network security appliances 108, 112, 116 is a firewall, a command (e.g., a SHUN command) is sent by the blocking module 118 to each one of the firewalls 108, 112, 116 coupled to the network 101 to block network access from the bad actor's IP address. According to another embodiment, where at least one of the network security appliances 108, 112, 116 is an IPS, the blocking module 118 updates the quarantine list of each IPS 108, 112, 116 coupled to the network 101 to include the IP address of the blocked bad actor. Upon blocking the identified bad actor across each access point 107, 109, 113 of the network, at block 710 the blocking module 118 is exited.

Various embodiments according to the present invention may be implemented on one or more computer systems or other devices. A computer system may be a single computer that may include a minicomputer, a mainframe, a server, a personal computer, or combination thereof. The computer system may include any type of system capable of performing remote computing operations (e.g., cell phone, PDA, tablet, smart-phone, set-top box, or other system). A computer system used to run the operation may also include any combination of computer system types that cooperate to accomplish system-level tasks. Multiple computer systems may also be used to run the operation. The computer system also may include input or output devices, displays, or data storage units. It should be appreciated that any computer system or systems may be used, and the invention is not limited to any number, type, or configuration of computer systems.

These computer systems may be, for example, general-purpose computers such as those based on PENTIUM®, POWERPC®, OR RISC SIGNAL PROCESSOR® processors, or any other type of processor. It should be appreciated that one or more of any type computer system may be used to partially or fully automate operation of the described system according to various embodiments of the invention. Further, the system may be located on a single computer or may be distributed among a plurality of computers attached by a communications network.

Figure 8:
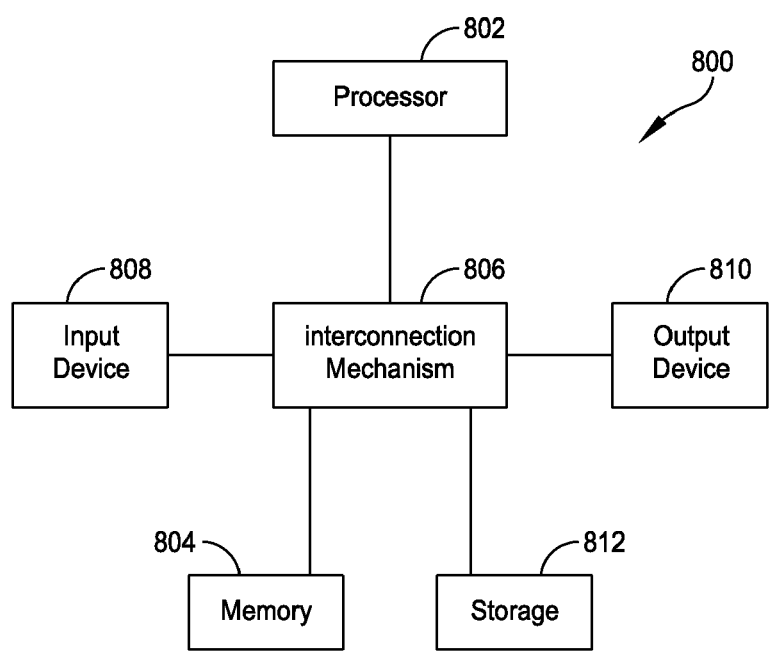
FIG. 8 is a block diagram of a general-purpose computer system upon which various embodiments of the invention may be implemented.

For example, various aspects of the invention may be implemented as specialized software executing in a general-purpose computer system 800 such as that shown in FIG. 8. The computer system 800 may include a processor 802 connected to one or more memory devices (i.e., data storage) 804, such as a disk drive, memory, or other device for storing data. Memory 804 is typically used for storing programs and data during operation of the computer system 800. Components of computer system 800 may be coupled by an interconnection mechanism 806, which may include one or more busses (e.g., between components that are integrated within a same machine) and/or a network (e.g., between components that reside on separate discrete machines). The interconnection mechanism 806 enables communications (e.g., data, instructions) to be exchanged between system components of system 800. Computer system 800 also includes one or more input devices 808, for example, a keyboard, mouse, trackball, microphone, touch screen, and one or more output devices 810, for example, a printing device, display screen, and/or speaker. In addition, computer system 800 may contain one or more interfaces (not shown) that connect computer system 800 to a communication network (in addition or as an alternative to the interconnection mechanism 806).

Figure 9:
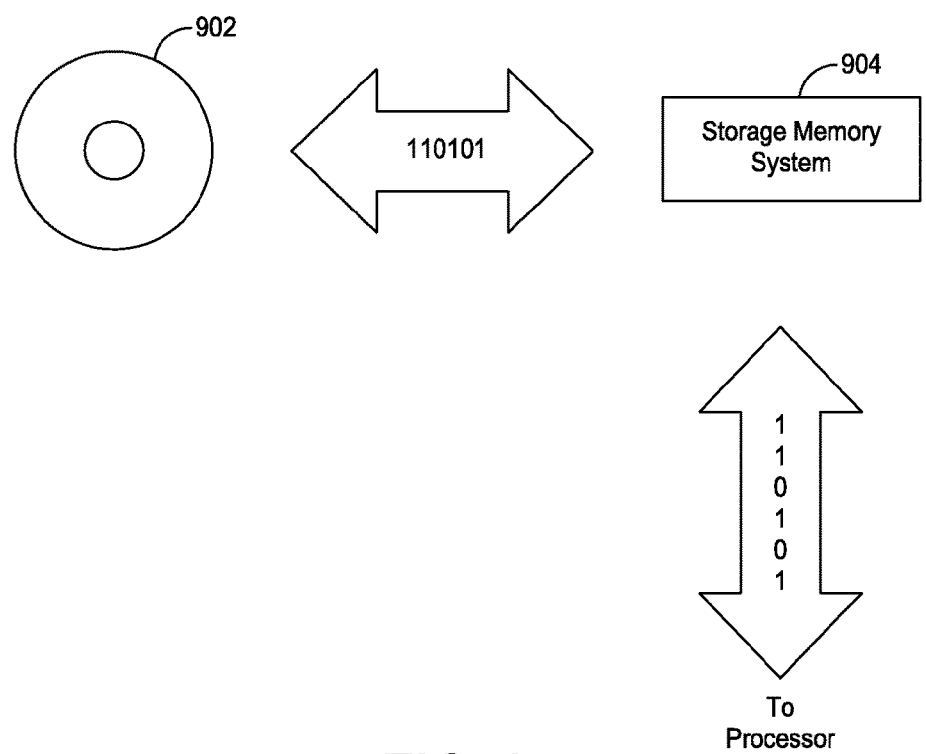
FIG. 9 is a block diagram of a computer data storage system with which various embodiments of the invention may be practiced.

The storage system 812, shown in greater detail in FIG. 9, typically includes a computer readable and writeable nonvolatile recording medium 902 in which signals are stored that define a program to be executed by the processor or information stored on or in the medium 902 to be processed by the program. The medium may, for example, be a disk or flash memory. Typically, in operation, the processor causes data to be read from the nonvolatile recording medium 902 into another memory 904 that allows for faster access to the information by the processor than does the medium 902. This memory 904 is typically a volatile, random access memory such as a dynamic random access memory (DRAM) or static memory (SRAM). It may be located in storage system 812, as shown, or in memory system 804. The processor 802 generally manipulates the data within the integrated circuit memory 804, 904 and then copies the data to the medium 902 after processing is completed. A variety of mechanisms are known for managing data movement between the medium 902 and the integrated circuit memory element 804, 904, and the invention is not limited thereto. The invention is not limited to a particular memory system 804 or storage system 812.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 800 is shown by way of example as one type of computer system upon which various aspects of the invention may be practiced, it should be appreciated that aspects of the invention are not limited to being implemented on the computer system as shown in FIG. 8. Various aspects of the invention may be practiced on one or more computers having a different architecture or components that that shown in FIG. 8.

Computer system 800 may be a general-purpose computer system that is programmable using a high-level computer programming language. Computer system 800 may be also implemented using specially programmed, special purpose hardware. In computer system 800, processor 802 is typically a commercially available processor such as the well-known PENTIUM® processor available from INTEL® Corporation. Many other processors are available. Such a processor usually executes an operating system which may be, for example, a WINDOWS®, LINUX®, OR UNIX® operating system, or any other operating system. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems.

Also, it should be appreciated that the invention is not limited to any particular distributed architecture, network, or communication protocol. Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

As described herein, the monitoring module 104 monitors three different third parties; however, in other embodiments, the monitoring module 104 may monitor any number and/or type of third party. As also described herein, the security operations center includes three users 122 (e.g., security officers), each with a corresponding terminal 124; however, in other embodiments, the security operations center may include any number of users and/or terminals.

As described herein, popup windows are utilized to provide information to a user and/or to prompt a user to take an action; however, in other embodiments, any other type of GUI may be utilized to provide information to the user, prompt a user to enter information, prompt a user to make a selection, etc.

As described herein, a blocking module is described to more easily block a bad actor from accessing the network of a large retailer; however, in other embodiments, the blocking module may be used by any type or size entity to prevent identified bad actors from accessing any type of network.

Embodiments described herein provide a system and method for automatically blocking an identified bad actor across each access point of a network. Once a bad actor is identified, the bad actor is automatically blocked at each access point of the network to prevent circumvention of the blocks. By simultaneously and automatically blocking a bad actor across each access point of a network, problems with block circumvention by the identified bad actor may be reduced as upon identification, the bad actor is automatically blocked across the network, at each network security appliance. Accordingly, time is not wasted manually blocking the identified bad actor at each individual network security appliance.

What is claimed is:

1. A system for restricting access to a network that includes a plurality of network access points and a plurality of network security appliances, the system comprising:
    a monitor coupled to the plurality of network access points, wherein the monitor monitors transmissions to the network via the plurality of network security appliances;
    a blocker coupled to the monitor via the network, wherein the blocker is a separate device from the monitor, and wherein the blocker is coupled to the plurality of network security appliances;
    a first security terminal coupled to the monitor; and
    a second security terminal coupled to the blocker;
    wherein the monitor identifies a potential bad actor based on a transmission from the potential bad actor to the network, and wherein the monitor transfers information related to the potential bad actor to the blocker via the network in response to receiving an indication from the first security terminal that the information should be transferred; and wherein the blocker blocks the potential bad actor from accessing the network in response to the blocker receiving an indication from both a first user operating the first security terminal and a second user operating the second security terminal that access to the network by the potential bad actor should be blocked.

2. The system of claim 1, wherein the monitor provides the information related to the potential bad actor to the first security terminal.

3. The system of claim 1, wherein the monitor identifies the potential bad actor by identifying at least one predefined trigger within the transmission from the potential bad actor.

4. The system of claim 3, wherein the at least one predefined trigger comprises a scan of a portion of the plurality of network access points.

5. The system of claim 3, wherein the at least one predefined trigger comprises a mapping of the network.

6. The system of claim 3, wherein the at least one predefined trigger comprises a profile scan of the network.

7. The system of claim 3, wherein the at least one predefined trigger comprises a Structure Query Language (SQL) injection into the network.

8. A system for restricting access to a retail network, the system comprising:
a plurality of network access points;
a plurality of network security appliances, each one coupled between at least one of the plurality of network access points and the retail network;
a monitor coupled between the plurality of network access points and the network wherein the monitor identifies a potential bad actor based on a transmission from the potential bad actor to the network;
a first security terminal coupled to the monitor; and
a second security terminal coupled to a blocker, wherein the blocker is a separate device from the monitor;
wherein the monitor transfers information related to the potential bad actor to the blocker via the retail network in response to receiving an indication from the first security terminal that the information should be transferred; and
wherein the blocker blocks the potential bad actor at each one of the plurality of network security appliances from accessing the network in response to the blocker receiving an indication from both a first user operating the first security terminal and a second user operating the second security terminal that access to the network by the potential bad actor should be blocked.

9. The system of claim 8, wherein the monitor provides the information related to the potential bad actor to the first security terminal, wherein the information is based on the transmission from the potential bad actor to the retail network via a first network access point of the plurality of network access points and a first network security appliance of the plurality of network security appliances.

10. The system of claim 9, wherein the information related to the potential bad actor comprises a bad act start time and a bad act end time.

11. The system of claim 10, wherein the information related to the potential bad actor comprises a bad act type identifier.

12. The system of claim 11, wherein the information related to the potential bad actor comprises a bad act description.

13. The system of claim 12, wherein the information related to the potential bad actor comprises a network access point of the plurality of network access points accessed by the bad actor.

14. The system of claim 13, wherein the information related to the potential bad actor comprises an intended target network device of the potential bad actor.

15. A method for restricting access to a network including a plurality of network access points and a plurality of network security appliances, each network security appliance coupled between at least one of the plurality of access points and the network, the method comprising:
monitoring, with a monitor, transmissions between third parties and the network via the plurality of network access points and the plurality of network security appliances;
identifying, with the monitor, a potential bad actor based on a transmission between the potential bad actor and the network;
determining, by a first user at a first security terminal, that the potential bad actor should be blocked from accessing the network;
transferring, from the monitor to a blocker via the network, information related to the potential bad actor in response to the monitor receiving an indication from the first user at the first security terminal that the information should be transferred;
providing, by the blocker, the information related to the potential bad actor to a second user at a second security terminal, wherein the blocker is a separate device from the monitor; and
configuring each one of the plurality of network security appliances to block the potential bad actor from accessing the network in response to the blocker receiving an indication from both the first user and the second user that the potential bad actor should be blocked from accessing the network.

16. The method of claim 15, further comprising displaying the information related to the potential bad actor to the first user via the first security terminal.

17. The method of claim 16, further comprising identifying at least one predefined trigger within the transmission from the potential bad actor.

18. The method of claim 17, wherein the information related to the potential bad actor comprises an intended target network device of the potential bad actor.

* * * * *